W. A. VAIL & O. E. SMITH.
TUBE FOR PNEUMATIC TIRES.
APPLICATION FILED AUG. 6, 1913.
1,092,130.
Patented Mar. 31, 1914.
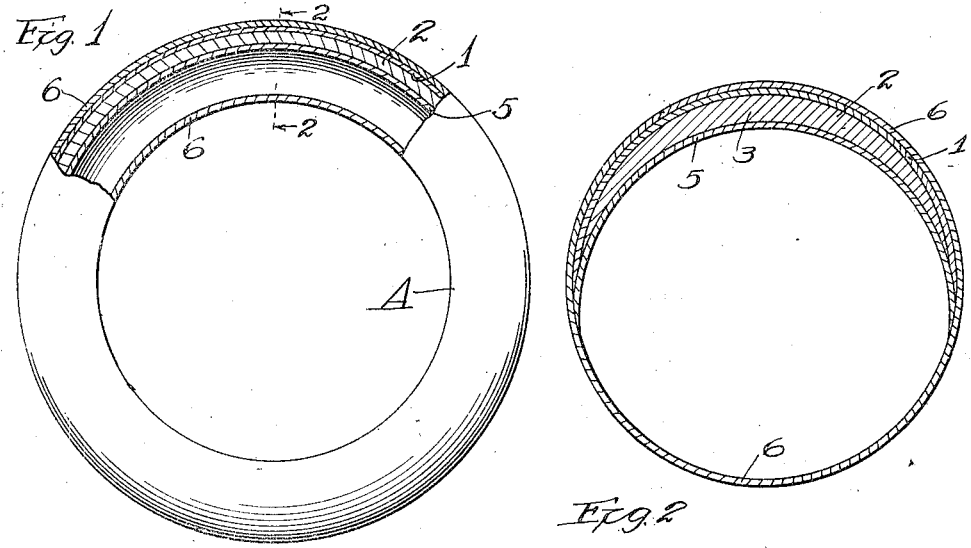
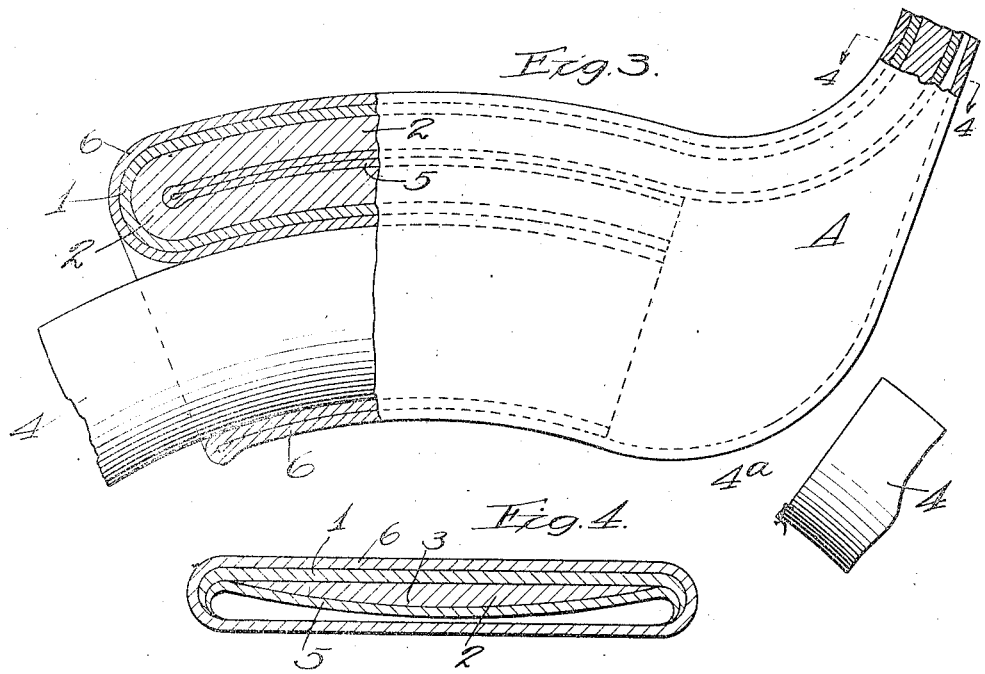

UNITED STATES PATENT OFFICE.

WILLIAM A. VAIL AND OSCAR E. SMITH, OF CHICAGO, ILLINOIS, ASSIGNORS OF ONE-FOURTH TO SAID VAIL, ONE-FOURTH TO SAID SMITH, ONE-FOURTH TO FRANCIS LACKNER, AND ONE-FOURTH TO JESSE HOLDEN, ALL OF CHICAGO, ILLINOIS.

TUBE FOR PNEUMATIC TIRES.

1,092,130. Specification of Letters Patent. Patented Mar. 31, 1914.

Application filed August 6, 1913. Serial No. 783,244.

*To all whom it may concern:*

Be it known that we, WILLIAM A. VAIL and OSCAR E. SMITH, citizens of the United States, residing at Chicago, in the county of Cook and State of Illinois, have invented new and useful Improvements in Tubes for Pneumatic Tires, of which the following is a specification, reference being had to the accompanying drawings, forming a part thereof.

The purpose of this invention is to provide an improved formation of an inner inflatable tube for a pneumatic wheel-tire.

It consists in the elements and features of construction shown and described as indicated in the claims.

In the drawings:—Figure 1 is a side elevation of a completed endless tube embodying this invention, the same being shown as inflated and partly in section at a plane transverse to the axis of the wheel through the center of the tread portion of the tire. Fig. 2 is a section at the line 2—2 on Fig. 1 upon an enlarged scale. Fig. 3 is a partly sectional view of a portion of the mandrel and of the tube thereon, in the process of stripping off the latter after it is molded and vulcanized thereon, section being made at an axial plane through the fold of the tube and also at the stripped-off end. Fig. 4 is a section at the line 4—4 on Fig. 3.

The specific purpose of the improvement which constitutes this invention is to render the inner tube substantially non-puncturable, or to prevent it from leaking when it is punctured. For this purpose, the tube is constructed so as to cause it at the tread portion to be strongly compressed at the inner side so that it will close up any puncture immediately upon withdrawal of the puncturing implements or point, the element outside of the compressed portion and which is of a character to cause the compression, as hereinafter explained, being also protected against the tendency to stretch open any gap or cut that is made by a puncturing point.

The result of causing compression of an inner portion to close up a puncture has heretofore been attempted by means which made the tube as a whole substantially non-stretchable at the side toward the tread. This method has been found objectionable, because a new tube of such construction was substituted for an old tube in an outer casing. The latter being permanently stretched by its previous use, the new inner tube would not fill it, and such inner tube being inflated to its limit and being unstretchable could not be forced into contact throughout its circumference with the inner surface of the outer casing, and thereby lacked the support of the outer casing, and in addition, was exposed to severe friction in slipping and rubbing upon the latter, resulting in rapid deterioration, and also tending to cause the rupture of the inner tube from the tension of inflation, which had to be resisted by the inner tube alone without the assistance of the outer casing. In the present invention, this compression of the inner portion by means of the outer portion is accomplished as will now be described.

The tube comprises, at the outer or tread side, a compression layer, 2, and a tension layer, 1, outside said compression layer, the compression layer being thickened throughout a zone at the outer or tread side of the tube, as shown at 3, and the entire thickness of the tube at this side within the tension layer being of rubber, which is relatively soft and compressible, as compared with the tension layer, 1, outside of it. The tension layer is made of a much harder and firmer grade of rubber, commonly called semi-hard, semi-vulcanite or semi-cured, being rubber of a character which, while retaining some capacity for stretching, elastically resists stretching very strongly, but develops a very strong retractile tension when even slightly stretched. The compression layer of the thickness, on the other hand, while highly resilient is comparatively soft so that it is readily compressed, developing a resilient expansive reaction against such compression. The tube is made in such manner, as hereinafter described, that if it were split open at the inner circumference so that all the layers of which it is composed would be free to react from the tension to which they are subjected in completing the tube, the tube would turn inside out, this resulting from the fact that when all the layers are free from stress, either of compression or expansion, the compression layer, 2, measures more in the direction of the circumference of the tube about its axis than the tension layer, 1. From this, it results that when the tube is in its completed condition for service—that is, having its ends joined or being made up endless,—the compression layer, 2, is under compression, because by its union with the tension layer, 1, it is confined to a width less than that which it had during vulcanization, the form that the tube naturally assumes in cross-section under these circumstances being such as shown in Fig. 4. From this, it results that when the tube is inflated, forcing it from the flattened form shown in Fig. 4 to the circular form shown in Fig. 2, the pression layer, 2, is subjected. The tension pressed by reason of the restraint of the tension layer, 1, the latter layer being very slightly stretched in coming to the circular form, its tractile reaction upon being thus stretched being approximately the measure of the compression to which the inner compression layer, 2, is subjected. The tension layer, however, being elastically extensible to a slight degree, and the belly or inner side of the tube,—that is, the side toward the center of the wheel,—being, as hereinafter explained, also elastically extensible, the tube as an entirety will yield to the inflating pressure to the extent that when the belly which stretches readily to its seat is thus seated, the outer or tread portion may be stretched by the pressure of inflation so as to seat snugly in an outer casing, in which, but for this slight capacity for stretching, it would fit loosely, with the resulting disadvantages above pointed out.

The result of the method of construction above described is that a tire compressing such an inner tube, whether originally fitted accurately to the outer casing or fitting the same loosely, or coming to accurate fit only when slightly expanded by the inflation, is substantially proof against leakage by puncture, because upon the puncturing point being withdrawn, the rubber of the compression layer, 2, follows it up closely and closes the puncture behind the puncturing point as the latter withdraws by the strong pressure of the elastic reaction of said compression layer due to the compression to which it has been subjected by the restraint of the outer comparatively unstretchable tension layer, 1, acting against the inner inflating pressure. It is, however, necessary to guard against the effect which is liable to be produced by a puncturing point when forced through a layer of rubber which is both quite stretchable and also quite tough. When a puncturing point, such as that of a tack or nail, especially if the point is somewhat blunt, is forced through such rubber, the rubber being stretched to a cone-like protrusion at the inner or emerging side, before it is finally ruptured is liable to rupture around the base of such cone, so that a small piece of the rubber will be punched out bodily, the rupture occurring suddenly and the piece being snapped out by the reaction, instead of the rubber being merely pierced by the puncturing point; and the hole or cavity thus left at the inner side of the rubber by the piece thus ejected is sometimes too large to be closed up by the reaction of the rubber from the compression described; especially since sometimes the piece thus snapped out will leave a hole nearly the entire thickness of the layer thus pierced. We avoid this danger by making at least the inner portion of the compression layer of rubber having a good percentage of mineral adapted to render it short-fibered. This rubber is somewhat harder than a purer rubber, which, but for the reason above indicated, might be used for the entire thickness of the compression layer, 1; but it is still sufficiently soft, compressible and elastic to serve well the purpose of closing up the puncture, as above described; and such short-fibered rubber not only will not be stretched by the puncturing point so as to cause a piece to snap out, as above described, but when it forms the inner surface it serves to prevent the stretching of the portion back of it, if the latter is of the character which would thus be stretched into cone form; and the result is that a puncturing point forced through the entire compression layer emerges by merely piercing the rubber without punching a piece out of it, and the puncture thus made is completely closed up behind the puncturing point as the latter withdraws, as above described.

It will be obvious that the outer tension layer is under tension which would normally operate to cause a cut or puncture once made to expand, and this tendency is much greater in the semi-hard or semi-vulcanite which is employed for this tension layer than it would be in a more nearly pure rubber having greater stretching capacity. The danger of such stretching of the puncture or cut in the tension layer is prevented by applying outside of it a layer or skin, 6, of nearly pure rubber having a great tensile elasticity or toughness; that is to say, pure long-fibered rubber having only a mixture of the necessary elements for proper vulcanization. This is the same quality of rubber which it is desirable to employ for the belly of the tube, and in constructing the tube it constitutes a continuous layer all around, extending outside the other layers at the tread and constituting the only layer at the belly or inner side of the tube.

In the process of construction of the tube, the layer, 6, is wrapped next to the annular mandrel, 4, on which the tire is molded. The compression portion, 2, thickened at the tread side, as illustrated, is next applied at the outer circumference of the mandrel, as clearly seen in Fig. 3. The outer portion, at least, of this compression layer, which is to be the inner layer when the tire is reversed or turned inside out, as hereinafter described, being of the short-fibered rubber above described; and when it is desired to employ a tougher softer rubber for the part of the compression layer next to the tension layer, this shorter-fibered portion is applied in a separate layer, 5 (see Figs. 3 and 4). When the tube thus molded on the mandrel has been vulcanized the proper degree, it is stripped off the mandrel,—the latter being a split ring with an opening, 4ª, permitting such stripping,—by reversing the tube from one end and pulling the reversed portion back over the remainder, after the manner of stripping a glove finger off the finger, as illustrated in Fig. 4. This brings the tension layer, 1, outside the compression layer, 2, the pure rubber skin, 6, being, however, outside the tension layer, and the last-applied short-fibered layer of the compression portion being now the innermost of the several layers at the tread. The tube is completed and rendered endless by telescoping the one end within the other and suitably joining the lapped portions in a manner well understood and not illustrated in detail.

In order that the several layers may have the characteristics necessary for their coöperation as described, we make them substantially as follows: Of the compression portion, the innermost layer, 8, which, as above described, is short-fibered rubber, is made of about fifty per cent. Pará or substantially equivalent rubber; forty per cent. mineral filler,—zinc oxid and whiting in approximately equal parts,—and the remainder of vulcanizing material,—sulfur and litharge in approximately equal parts. The remainder of the compression portion, 2, next inside of the tension layer, 1, may, if preferred, be of a somewhat softer and purer quality of rubber; for example, about sixty-five per cent. pure Pará, and correspondingly less of a rubber compound made up of mineral filler. The tension layer consists of fifty per cent. of asbestine or finely reduced or powdered asbestos fiber, for hardening and toughening the stock, the remainder being substantially pure Pará with the necessary vulcanizing material, all the elements being thoroughly incorporated with each other in the usual manner of incorporating mineral fillers with rubber stock for producing rubber fabric. The outermost layer, which also extends around to form the belly, is, as above stated, substantially pure Pará rubber, with only the necessary mixture for vulcanizing material.

Beside the purpose of operating as a tension member for holding the portion, 2, compressed, as above described, the layer, 1, operates as a partial non-conductor of heat, preventing the heating and consequent over-vulcanizing or hardening of the inner compression portion, and also the increase of pressure which results from such heating and causes blow-outs. The asbestine or asbestos fiber which is employed, as above described, in said tension layer has this effect upon the properties of said tension layer.

We claim:—

1. An inflatable endless tube for a pneumatic tire, whose side toward the tread comprises an inner portion of relatively soft and compressible rubber, and outside of said compressible portion a layer of semi-hard rubber, said outer harder layer being normally less in transverse dimension than the inner softer layer and being normally slightly stretched transversely while the inner softer layer is compressed, and an outer skin or layer of highly elastic and tough rubber.

2. An inflatable endless tube for a pneumatic tire, whose side toward the tread comprises an inner layer of relatively soft and compressible rubber of which the innermost portion is short-fibered, and outside of said inner compressible layer a tension layer of semi-hard rubber having slight stretchability and strong elastic reaction, and being normally less in transverse dimension than the inner compressible portion, the inner compressible portion being normally compressed while the tension layer is normally slightly stretched.

3. An inflatable endless tube for a pneumatic tire, whose side toward the tread comprises an inner portion of relatively soft and compressible rubber, of which the innermost portion is short-fibered; a layer outside said compressible layer composed of semi-hard rubber slightly stretchable and having strong elastic reaction, and an outer layer or skin of substantially pure long-fibered highly elastic rubber, the inner compressible portion at the tread side being normally compressed and the layers outside it being normally slightly stretched.

In testimony whereof, we have hereunto set our hands, respectively, at Chicago, Illinois, this 29th day of July, 1913.

WM. A. VAIL.
O. E. SMITH.

Witnesses:
 CHAS. S. BURTON,
 M. G. ADY.

Correction in Letters Patent No. 1,092,130.

It is hereby certified that the name of the fourth-mentioned assignee in Letters Patent No. 1,092,130, granted March 31, 1914, upon the application of William A. Vail and Oscar E. Smith, of Chicago, Illinois, for an improvement in "Tubes for Pneumatic Tires," was erroneously written and printed "Jesse Holden," whereas said name should have been written and printed *Jesse Holdom;* and, that the said Letters Patent should be read with this correction therein that the same may conform to the record of the case in the Patent Office.

Signed and sealed this 9th day of June, A. D., 1914.

[SEAL.]

J. T. NEWTON,
*Acting Commissioner of Patents.*